US005097893A

United States Patent [19]

Trimble

[11] Patent Number: 5,097,893

[45] Date of Patent: Mar. 24, 1992

[54] COUNTER FLOW TUBE-MANIFOLD RADIANT FLOOR HEATING SYSTEM

[76] Inventor: Norman V. Trimble, 5026 Williams Road, Richmond, B.C., Canada, V7E 1K1

[21] Appl. No.: 635,772

[22] Filed: Dec. 28, 1990

Related U.S. Application Data

[63] Continuation-in-part of Ser. No. 389,041, Aug. 3, 1989, abandoned.

[51] Int. Cl.[5] ........................ F24D 19/00; F24H 9/12

[52] U.S. Cl. ........................................ 165/46; 165/49; 165/56; 237/69; 285/249; 285/255; 285/342; 251/8

[58] Field of Search ............................ 165/46, 49, 56; 285/246, 249, 255, 342; 237/69

[56] References Cited

U.S. PATENT DOCUMENTS

| | | | |
|---|---|---|---|
| 3,893,507 | 7/1975 | MacCraken et al. | 165/46 |
| 4,032,177 | 3/1976 | Anderson | 285/249 |
| 4,205,719 | 6/1980 | Norell et al. | 165/49 |
| 4,414,960 | 11/1983 | Wasserman | 165/46 |
| 4,779,673 | 10/1988 | Chiles et al. | 165/905 |
| 4,817,707 | 4/1989 | Aoyama et al. | 165/49 |

FOREIGN PATENT DOCUMENTS

| | | | |
|---|---|---|---|
| 1964395 | 10/1971 | Fed. Rep. of Germany | 165/49 |
| 2635903 | 2/1978 | Fed. Rep. of Germany | 165/49 |
| 2913155 | 10/1980 | Fed. Rep. of Germany | 165/56 |
| 1029954 | 6/1953 | France | 165/56 |
| 7511467 | 4/1976 | Netherlands | 285/249 |
| 882115 | 11/1961 | United Kingdom | 285/249 |

*Primary Examiner*—John K. Ford

*Attorney, Agent, or Firm*—Trask, Britt & Rossa

[57] ABSTRACT

This invention relates to a novel counter flow tube-manifold heat exchanger which can be installed in a wood or concrete floor and used to heat the floor and the earth space associated with the floor. A heat exchanger for conveying a heat containing fluid material in counter flow pattern comprising a hollow conduit comprised of three hollow elongated resillient fluid conducting tubes which are disposed parallel to and are joined to one another; and a first hollow elongated manifold with ports therein; and a second hollow elongated manifold, with ports therein adapted for connection with the ends of the tubes, the first ends of two of the three tubes being connected to the ports of the first manifold and the opposite ends of the same two tubes being connected to ports of the second manifolds, and the first end of the third tube adjacent the first ends of the two tubes being connected to a port of the second manifold, while the opposite end of the third tube is connected to a port of the first manifold.

10 Claims, 3 Drawing Sheets

COUNTER FLOW TUBE-MANIFOLD RADIANT FLOOR HEATING SYSTEM

This is a continuation-in-part of application Ser. No. 07/389,041, filed Aug. 3, 1989, now abandoned.

FIELD OF THE INVENTION

This invention relates to a novel counter flow tube-manifold radiant floor heating system. More particularly, this invention relates to a novel counter flow tube-manifold heat exchanger combination which can be installed in a wood or concrete floor and used to heat the floor and the earth space associated with the floor.

BACKGROUND OF THE INVENTION

Radiant heating systems, such as those used to heat concrete or wood floors of residential and commercial buildings, typically employ hot water conveying copper pipe embedded within a concrete slab, or in sand beneath the slab thereby providing additional thermal mass. Heated water is circulated through the pipes to transfer thermal energy from the water to the concrete or sand, and in turn heat the space above the slab by radiation.

Heat transfer systems using copper pipe have several serious shortcomings. They are subject to corrosion, particularly by alkali in the concrete. The thermal expansion and contraction of the pipes together with the shifting and cracking of the concrete impose stresses which can cause leaks in the pipe. Those leaks are virtually impossible to repair without tearing up the floor.

Concrete has a low rate of heat transfer in comparison to copper. The use of low temperature water with copper pipe is inefficient and is not economically practical. Copper pipe is expensive and the cost of such systems becomes prohibitive unless relatively high water temperatures are employed.

An alternative to copper pipe is a thermoplastic pipe such as rigid or semi-flexible polyvinyl chloride pipe. Thermal expansion and contraction of the thermoplastic pipe is low. Since thermoplastic pipe can be expanded if necessary, freezing water which expands on becoming frozen cannot cause ruptures to the pipe. The elastic properties of the thermoplastic pipe also make it more resistant to damage caused by shifting or cracking of the concrete floor. The thermoplastic tubular system is low in initial cost and is particularly advantageous for efficient low-temperature heat transfer.

Five U.S. patents, a Canadian patent and a German patent disclose inventions which are relevant to radiant heat and chilled floor systems of general interest. These patents are listed below.

| | Inventor | Issue Date |
|---|---|---|
| U.S. Pat. No. | | |
| 3,893,507 | MacCracken et al. | July 8, 1975 |
| 4,032,177 | Anderson | June 28, 1977 |
| 4,269,172 | Parker et al. | May 26, 1981 |
| 4,779,673 | Chiles et al. | October 25, 1988 |
| 4,782,889 | Bourne | November 8, 1988 |
| Canadian Patent Number 1,111,839 | Zinn et al. | November 3, 1981 |
| German Patent Number 1,964,395 | Von Dresky | December 23, 1969 |

In U.S. Pat. No. 4,269,172, Parker et al. disclose a solar hot-water heating system which is suitable for mounting on the roofs of buildings. The system includes manifolds 20 and 21, and triple tubes 18 and 22 (FIG. 2). The result is an arrangement of circulation ducting which has heat exchange benefits and reduces overall heat loss.

Chiles et al. in U.S. Pat. No. 4,779,673 disclose a heat exchanger construction which, in one embodiment, can be embedded in a concrete floor. The system includes tubing 20 connected to parallel manifolds 30 and 32 (see FIG. 2). There is not any heat exchange capacity between the adjacent tubes. Chiles et al. do not disclose units of triple abutting tubes.

Bourne in U.S. Pat. No. 4,782,889 discloses a low mass hydronic radiant floor heating system which includes a metal deck which has regularly spaced troughs therein. Tubing is placed in the troughs to distribute heat by circulating warm liquid through the tubing. In this arrangement the tubing is not embedded in the concrete. Bourne does not disclose counter current fluid flow through a triple abutting tube unit system.

MacCracken, in U.S. Pat. No. 3,893,507, discloses a grid system of single plastic tubes which is used to create and maintain an ice slab. The tubes are not intrinsically joined into triplets. The single tubes are joined at specified locations by clips. MacCracken does not disclose a unitary triple abutting tube combination with a unique tube-manifold connection system.

Anderson, in U.S. Pat. No. 4,032,177, discloses a compression fitting for a tubing system including a nut 31, double female thread fitting body 10, insert 30, and compression sleeve 23. The fitting is not specific to the radiant floor heating industry. The fitting is designed to secure a flexible tube to a metal fitting. The Anderson fitting is prone to causing damage to the flexible tubing because it is easy overtighten the nut and cause the rigid sleeve at the end away from the nut to bend against the tube and puncture the tube. Anderson does not disclose a resilient sleeve which bears against an area of the tubing and yields when the nut is over-tightened, thereby avoiding puncturing or weakening the tube.

In Canadian Patent No. 1,111,839, Zinn et al. disclose a heat exchanger in the form of a mat having a plurality of fluid conducting tubes arranged parallel to one another and joined by connecting webs. More particularly, Zinn et al. disclose a heat exchanger for radiant floor use having six parallel fluid-conducting tubes of elastomeric material. The tubes are formed in an elongated mat with flexible webs separating and connecting adjacent tubes. Opposite end portions of all of the tubes remote from the central mat section are free of the webs and are connected to respective hollow manifolds through respective holes in the manifold walls. The tubes or mats are formed integrally by extrusion of an elastomeric material such as synthetic rubber and particularly EPDM (polymerized ethylenepropylenediene monomer or terpolymer). A problem with plastics, and EPDM in particular, is that when hot water first enters such tubes, the hot water forms a soft spot adjacent the inlet and consequently in situations where the tube is connected to a simple solid metal nipple or fitting, and the water is under pressure, the tube tends over time to work free from the nipple or fitting.

Von Dresky, in German Patent No. 1,964,395, discloses a square cross-section, interlocking tube system for a floor heating system. Von Dresky does not disclose a circular cross-section abutting triple tube unit which can be readily split apart, or maintained as a unit. Von Dresky does not show counter current flow or a dual manifold system, or a unique tube gripping fitting.

SUMMARY OF THE INVENTION

This invention pertains to a manifold-triple tubing counter current heat exchange system for radiant floor use comprising: (1) one or more conduits each comprised of three elongated thermoplastic fluid-conducting tubes which are parallel to and joined to each other; (2) a pair of tubular manifolds located adjacent to one another, the respective ends of the thermoplastic fluid-conducting tubes being connected to the respective tubular manifolds; and (3) fittings connecting the tubes to the manifolds, the fittings having resilient members which grip the tubes without harming the tubes.

An apparatus for conveying a heat containing fluid material in counter-current pattern in the conduits an embedded floor heating system consisting essentially of: (a) a hollow fluid conducting conduit consisting essentially of three hollow cylindrical elongated resilient fluid conducting integrally formed tubes which are disposed parallel to and abut one another along the substantial portion of their length, with no webs therebetween, which tubes have first and second ends adapted for use in an embedded floor heating system; (b) a first hollow fluid conducting elongated manifold with ports and fittings therein adapted for connection with the first ends of the tubes, the manifold being positioned exterior to the heated floor; and (c) a second hollow fluid conducting elongated manifold with ports and fittings therein adapted for connection with the second ends of the tubes, the first ends of the two outer tubes being connected to the ports and fittings of the first manifold and the opposite ends of the same two tubes being connected to the ports and fittings of the second manifold, and the first end of the third middle tube abutting the first ends of the two outer tubes being connected to a port and fitting of the second manifold, while the opposite end of the third middle tube is connected to a port and fitting of the first manifold, the fitting being connected to the port of a respective manifold consisting essentially of: (d) a hollow nut which has a female thread therein, and an inwardly projecting flange at one end thereof, said nut circumscribing the tube; (e) a ferrule formed of a resilient substance and being tapered on the exterior and having a hollow cylindrical configuration in the interior circumscribing the tube, the ferrule being positioned completely inside the interior of the nut, the broader end of the exterior tapered ferrule abutting the flange of the nut; (f) a hollow cylindrical member which has a flange on one end thereof, which member is of substantially the same length as the nut and is adapted to fit inside an end of the tube with the flange located at the end of the tube; and (g) an elongated tubular member having a male thread at one end thereof adapted to receive the female thread of the nut, the end removed from the thread being adapted to penetrate through the port into the interior of the manifold, the combination of the nut and the tubular member holding the end of the tube between the tapered ferrule and the cylindrical member.

DRAWINGS

In drawings which depict specific embodiments of the invention, but which should not be construed as restricting or confining the spirit or scope of the invention in any way:

DETAILED DESCRIPTION OF SPECIFIC EMBODIMENTS OF THE INVENTION

Figure 1:
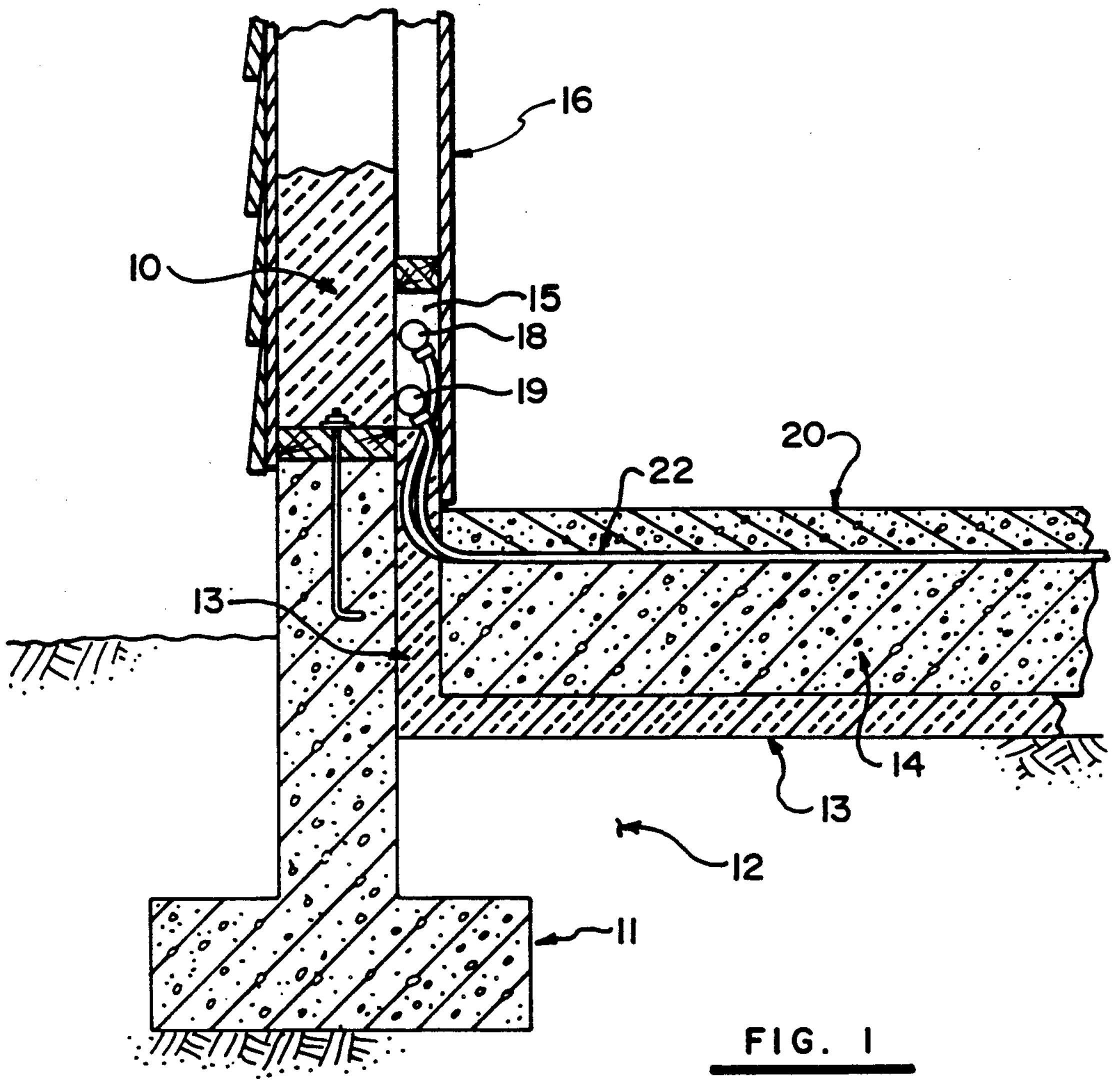
FIG. 1 represents a cross-section elevation view of a typical slab concrete floor employing the tube-manifold heat exchanger of the invention.

FIG. 1 shows in cross-section side elevation view a typical wood-frame wall 10 supported by a concrete footing foundation 11 over earth substrata 12. In the construction of the floor adjacent the wall 10 and foundation 11, insulation 13 is first laid horizontally on the earth substrata 12. An overlying first concrete slab 14 is then applied over the insulation 13. Several of the triple tube heat exchanger conduits 22 of the invention are then placed spatially in a traversing pattern over the lower concrete slab 14. An overlying layer of concrete 20 is then poured over the conduits 22.

Figure 3:
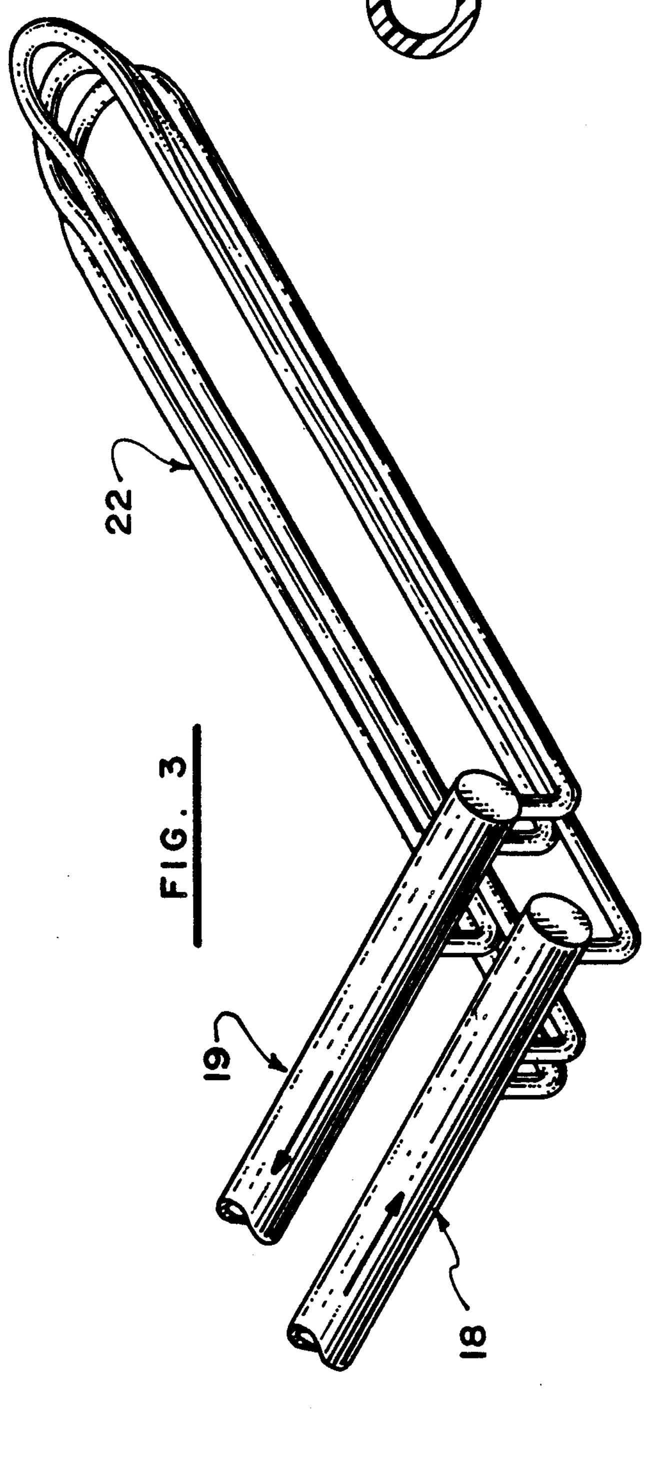
FIG. 3 represents an isometric view showing a typical conduit installation with unitary triple abutting tube connection to a pair of manifolds.

The three tubes of each conduit 22 are connected to the pair of manifolds 18 and 19 (shown in wall 10) according to the method shown in FIG. 3. In a typical floor heating installation, there are several manifold pairs located in the wall adjacent the floor with numerous three-tube conduit lines 22 connecting each pair. The manifolds 18 and 19 are typically located in a space 15 between the wall 10 and interior wall finish 16. The final poured concrete floor slab 20 is applied as a matrix over the conduits 22 so that they are embedded in the concrete.

The construction described above is illustrative for purposes of disclosing the invention and will vary depending upon the building conventions, building codes and construction practices of different geographic regions.

Figure 2:
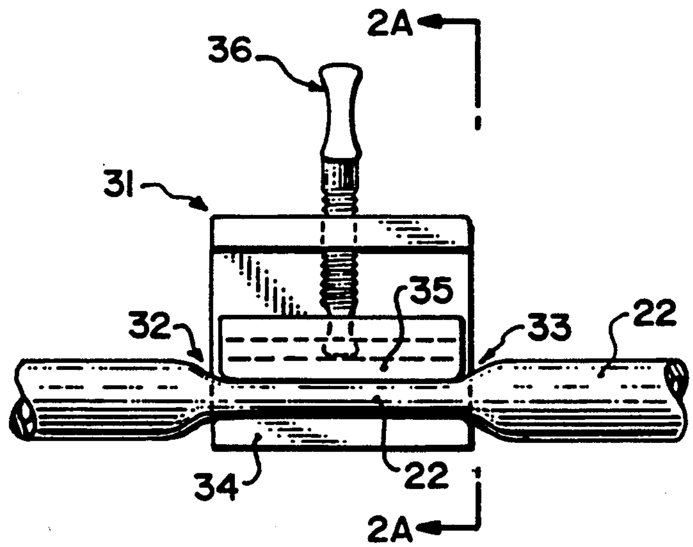
FIG. 2 and 2A represent fragmentary front and side views of a clamp for isolating or closing the ends of one or more tubes.
Figure 2A:
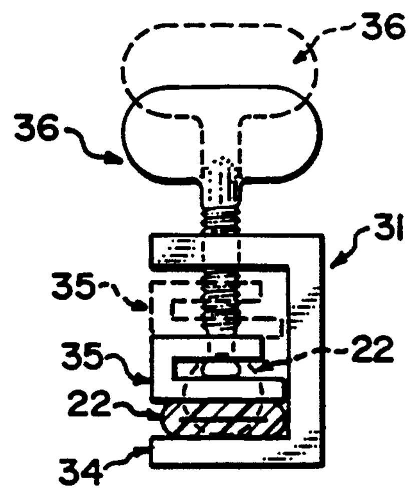

In FIG. 2 a form of clamp 31 is shown by which one of the tubes 22 may be pinched to prevent fluid flow through the tube 22. The clamp 31 has aligned holes 32 and 33 through which the end portion of the tube 22 is inserted. Opposed squeezing portions 34 and 35 compress the tube 22 to close it. Adjustable temperature control may be achieved by tightening the screw 36 of the clamp 31 reducing the flow of fluid through the tube 22. This method can be used to custom regulate fluid pressures and flows through the network of tubes and correct over-heating problems in certain areas. In addition, if a leak occurs individual tubes 22 can be clamped off to isolate damage while the operation of the remainder of the tube network system continues to be unaffected.

FIG. 3 shows in isometric view a typical connection of one triple-tube conduit 22 to one pair of manifold 18 and 19. The arrows indicate the direction of fluid flow through the manifolds. It is readily apparent in FIG. 3 that each tube (which is typically constructed of a resilient low oxygen transmission rubber) in the conduit constitutes a loop between the two manifolds 18 and 19 and that the heat-transfer fluid in the system flows in counter-current pattern through the full length of tube 22 when passing from one manifold to the other.

FIG. 3 also demonstrates that the alternate connection of the tubes 22 to the manifolds 18 and 19 dictates that fluid flow in adjacent tubes will be in opposite (counter flow) directions. This reverse directional flow in alternate tubes 22 creates temperature averaging in the adjoining triple-tube conduits and provides for uniform floor temperatures. The manifolds 18 and 19 typically have a minimum inside diameter of 2.5 cm and may be made of a plastic such as PVC or a metal such as copper.

While FIG. 3 shows only one set of conduit tubes 22, it will be understood that a series of conduits are spatially disposed and connected along the lengths of the two manifolds. This enables a network of conduits to be spatially laid over a floor surface. Better heat distribution for counter current flows can be alternated in adjacent triple tube conduit combinations.

Figure 4:
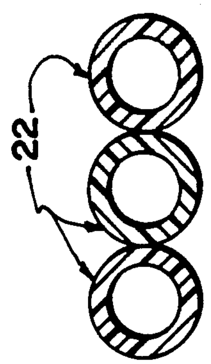
FIG. 4 represents a transverse section through one tube conduit showing the adjacent webless triple-tube combination.

FIG. 4 depicts a transverse section through one conduit and shows the adjoining triple-tube arrangement of the conduit. The conduit is extruded as a triple tube unit from natural rubber, or some other suitable low air and oxygen transmitting resilient material. No webs exist between the three tubes.

Figure 5:
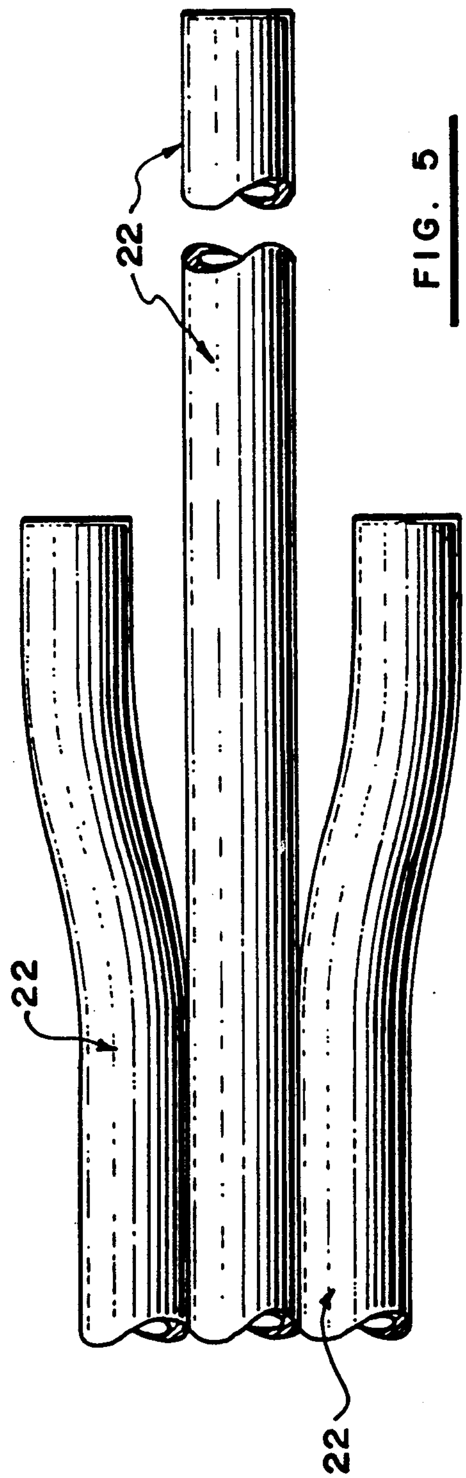
FIG. 5 represents a fragmentary plan view of an end of a tube conduit showing the triple abutting tubes split and adapted for connection to a pair of manifolds, the longer middle tube being connected to a manifold different from the two shorter outer tubes.
Figure 6:
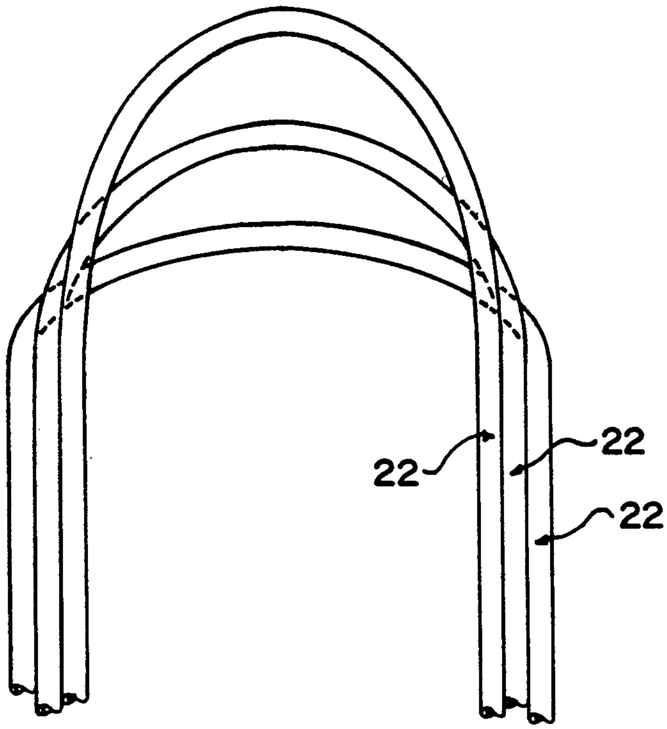
FIG. 6 represents a fragmentary plan view of a central section of a triple tube conduit removed from the pair of manifolds, the tubes in the central section being split apart.
Figure 7:
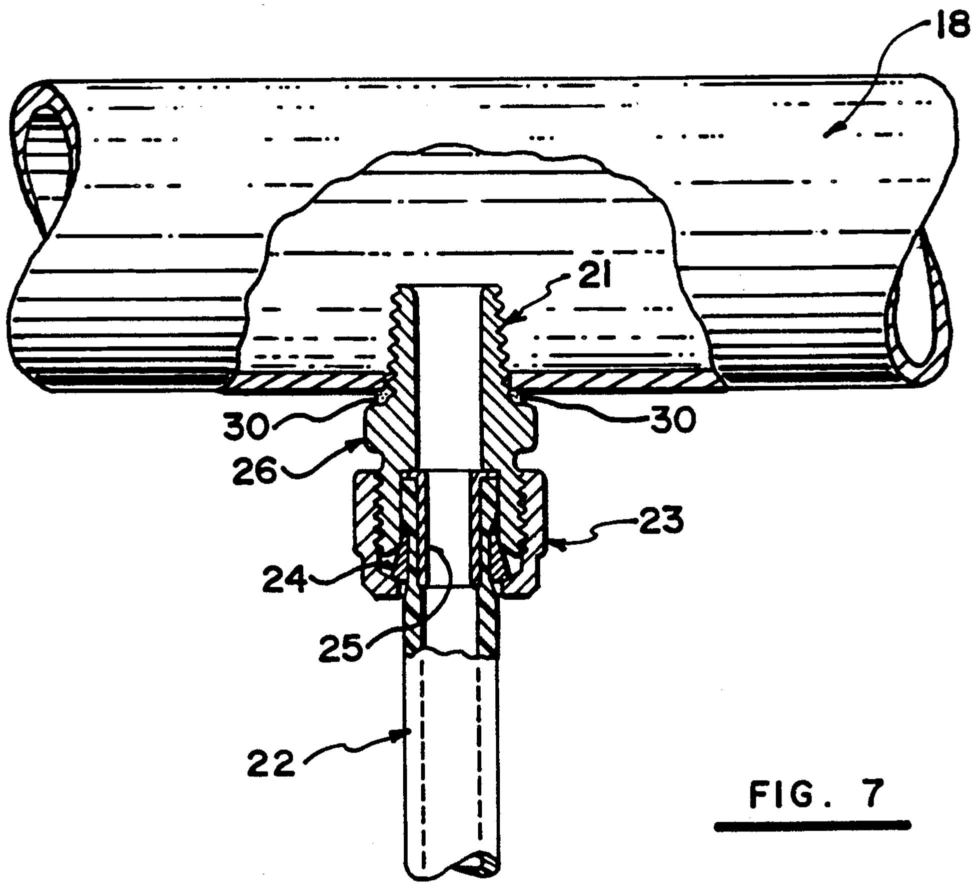
FIG. 7 represents an enlarged partially cut-away view of the connection between the end of one tube of a triple tube conduit and a fitting in the port of a manifold.

FIGS. 5, 6 and 7 illustrate the connection details of the triple-tube conduit of the tube heat exchanger to the manifold. Specifically, FIG. 5 shows the separation of the three tubes of a conduit 22 a few centimeters from the end before connection to the manifold. Each tube 22 is cut to the appropriate length for alternate connection to the respective manifolds in order to set up the counter-current fluid flow.

FIGS. 5 and 6 illustrate the manner in which the three tube conduit is separated into independent tubes 22 by splitting one tube from another. This can be done by hand. This practice is performed at corners and at the ends where the conduit must pass through 90° or 180° bends. The tubes 22 can make smooth sharp turns when not attached to each other. No webs between the tubes are required. The absence of webs between the tubes 22 enhances heat transfer from the fluid in one tube to the fluid in another, thereby enhancing the performance of the counter-current flow system.

FIG. 7 shows an enlarged side cut-away view of the connector 21 on the wall of the manifold 18. The connector 21 in combination with other parts enables the tube 22 to be connected to the manifold 18 without fear of the tube 22 working free over time from the manifold 18 due to fluctuations in temperature. The thermoplastic tube 22 has a specified inside and outside diameter. A compression nut 23 the size of the outside diameter of the tube 22 slides over the tube 22. A ferrule 24 constructed of a resilient material, for example, Nylon, with an inside diameter equal to the outside diameter of the tube 22 slides over the tube. A hollow cylindrical insert 25 with a flange on one end having an outside diameter at least as great as the inside diameter of the tube 22 and having an axial length greater than the axial length of the cylindrical hole in the connecting fitting 26 penetrating into the manifold 18 fits inside the end of the tube 22. The fitting 26 is threaded into the manifold 18 and is soldered at the joint with the manifold 18 to make it fluid-tight. To install, the tube 22 is inserted into the connecting fitting 26 extending through the port in the manifold. The compression nut 23 is tightened on the resilient ferrule 24 which then grips the tube 22. The ferrule 24 has a tapered shape which causes it to run under the end of fitting 26, when nut 23 is tightened. In this way, the ferrule 24, which is cylindrical in its inner tube contacting surface, squeezes the tube 22 along its entire interior surface. In this way, the tube 22 is not at a localized point, which may weaken or puncture the tube 22. Since the ferrule 24 is constructed of resilient material, such as Nylon, it can yield under excessive force and thereby avoid puncturing the tube 22 at a localized spot, even when the nut 23 is overtightened. The tube 22 is thereby securely connected to the manifold 18 and cannot work free from constant contraction and expansion due to heat fluctuation of the fluid conveyed by the tube 22. The end of the fitting 26 opposite the tube 22 is affixed to the port in the manifold 18 by a ring of high temperature solder 30 around the fitting 26. While a male thread is shown at the end of fitting 26, penetrating the port in the manifold 18, such thread is not necessary. The end of the fitting can be smooth.

In accordance with the invention, the manifold-tube connecting fitting 26 protrudes about 25 to 50 percent into the manifold 18. This protruding design is deliberate and necessary because it promotes fluid turbulence and uniform temperatures and discourages the possibility of foreign materials passing along the manifold 18 from entering the thermoplastic tubing 22 and plugging the tubing over time. The turbulence assists in balancing the temperature of the water flow rate equally through all the tubes.

Method of Installation

In preparing a tubing arrangement for a radiant floor heating installation, the triple-tube conduit 22 is unrolled from an extended length and cut to individually designed lengths for connection to a manifold pair. In a given radiant floor heating application, the length of tubing and the tubing arrangement are usually designed according to the heat loss properties of the specific building.

In a typical concrete slab installation, a layer of mastic or a wire mesh (typically 15 cm×15 cm×0.32 cm) placed over the tube supporting surface ensures that the tubing remains in its designed arrangement during the concrete pouring process.

The tube heat exchanger of the invention has a continuous multi-tube profile which is easily covered by thin slabs of concrete. In the event of failure of any one tube, the damaged tube can be clamped off (using the clamp in FIG. 2) adjacent to the manifolds (above the concrete floor) and isolated so that the remainder of the system continues to function properly. Similarly, selected tubes may be clamped off or restricted to isolate areas from the heat exchange fluid and thus make it possible to correct areas of over-heating.

Once the manifold pairs are installed as illustrated in FIG. 1, and the tubes 22 are distributed spatially over the floor surface, the ends of the tubes 22 are connected in alternating arrangement to dual manifolds 18 and 19 (to set up the counter flow) using the tube holding fittings illustrated in FIG. 7. Once all connections are completed, concrete is poured over the tubes 22 that are spread over the underlying floor. A radiant heated floor is thereby formed.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. An apparatus for conveying a heat containing fluid material in counter-current pattern in the conduits an embedded floor heating system consisting essentially of:

(a) a hollow fluid conducting conduit consisting essentially of three hollow cylindrical elongated resilient fluid conducting integrally formed tubes which are disposed parallel to and abut one another along the substantial portion of their length, with no webs therebetween, which tubes have first and second ends adapted for use in an embedded floor heating system;

(b) a first hollow fluid conducting elongated manifold with ports and fittings therein adapted for connection with the first ends of the tubes, the manifold being positioned exterior to the heated floor; and (c) a second hollow fluid conducting elongated manifold with ports and fittings therein adapted for connection with the second ends of the tubes, the first ends of the two outer tubes being connected to the ports and fittings of the first manifold and the opposite ends of the same two tubes being connected to the ports and fittings of the second manifold, and the first end of the third middle tube abutting the first ends of the two outer tubes being connected to a port and fitting of the second manifold, while the opposite end of the third middle tube is connected to a port and fitting of the first manifold, the fitting being connected to the port of a respective manifold consisting essentially of:

(d) a hollow nut which has a female thread therein, and an inwardly projecting flange at one end thereof, said nut circumscribing the tube;

(e) a ferrule formed of a resilient substance and being tapered on the exterior and having a hollow cylindrical configuration in the interior circumscribing the tube, the ferrule being positioned completely inside the interior of the nut, the broader end of the exterior tapered ferrule abutting the flange of the nut;

(f) a hollow cylindrical member which has a flange on one end thereof, which member is of substantially the same length as the nut and is adapted to fit inside an end of the tube with the flange located at the end of the tube; and (g) an elongated tubular member having a male thread at one end thereof adapted to receive the female thread of the nut, the end removed from the thread being adapted to penetrate through the port into the interior of the manifold, the combination of the nut and the tubular member holding the end of the tube between the tapered ferrule and the cylindrical member.

2. An apparatus as defined in claim 1 wherein the first and second manifolds are arranged parallel to one another.

3. An apparatus as defined in claim 2 wherein a plurality of fittings are spatially disposed in ports along the length of the first and second manifold.

4. An apparatus as defined in claim 1 wherein the end of the tubular member removed from the male thread penetrates into the manifold 25 to 50 percent to thereby induce turbulence in the fluid flowing in the manifold.

5. An apparatus as defined in claim 1 wherein the ferrule has an inner surface which is adapted to contact the tube over an area and minimize localized pressure on the tube.

6. An apparatus as defined in claim 5 wherein the ferrule is formed from a material which yields upon undue pressure exerted on it by overtightening of nut (d) thereby not damaging the tube of the conduit.

7. A heat exchanger as claimed in claim 1 wherein the connections of the three tubes of adjacent conduits are alternated along the lengths of the first and second manifolds.

8. A heat exchanger as claimed in claim 1 wherein the exterior surface of the ferrule is tapered so that the thin end fits under the end of the tubular member with the male thread.

9. A heat exchanger as claimed in claim 1 wherein the ferrule is constructed of Nylon.

10. A heat exchanger as claimed in claim 1 wherein the conduit is formed of rubber.

* * * * *